US007039192B1

(12) United States Patent
Whelan

(10) Patent No.: US 7,039,192 B1
(45) Date of Patent: May 2, 2006

(54) METHODS FOR DATA ENCRYPTION USING MULTIPLE LAYER STEGANOGRAPHY

(75) Inventor: Joey Eugene Whelan, Flower Mound, TX (US)

(73) Assignee: Verizon Services Corp., Arlington, VA (US)

( * ) Notice: Subject to any disclaimer, the term of this patent is extended or adjusted under 35 U.S.C. 154(b) by 832 days.

(21) Appl. No.: 10/016,078

(22) Filed: Dec. 13, 2001

(51) Int. Cl.
*G06F 17/00* (2006.01)

(52) U.S. Cl. ........................ 380/281; 380/279; 380/278

(58) Field of Classification Search ................ 380/259, 380/282, 281, 279–278, 277; 413/171, 193; 705/51
See application file for complete search history.

(56) References Cited

U.S. PATENT DOCUMENTS 5,822,436 A * 10/1998 Rhoads ........................ 380/54
2001/0004736 A1 * 6/2001 Hirano et al. ................. 705/51

OTHER PUBLICATIONS

An adaptive data hiding technique for binary images; Tung-Hsiang Liu; Long-Wen Chang; Pattern Recognition, 2004 ICPR 2004. Proccedings of the 17th International Conference on; Vol. 4, Aug. 23-26, 2004 Page(s):831-833 vol. 4.*
Secure identity authentication and logical access control for airport information systems; David et al..; Security Technology, Proceedings. IEEE 37th Annual 2003 International Carnahan Conference on Oct. 14-16, 2003 Page(s): 314-320.*
Safe primes density and cryptographic applications; Duran Diaz, R.; Monteya Vitini, F.; Munez Masque, J.; Security Technology, 1999. Proceedings. IEEE 33rd Annual 1999 International Carnahan Conference on Oct. 5-7, 1999 Page(s):363-367.*
Provos, Niels et al., "Detecting Steganographic Content on the Internet," CITI Technical Report 01-11, University of Michigan, Aug. 31, 2001, 13 pages.

* cited by examiner

*Primary Examiner*—David Jung
(74) *Attorney, Agent, or Firm*—Leonard C. Suchtya, Esq.; Joel Wall, Esq.

(57) ABSTRACT

A method for embedding a message within a file may include generating a session key [305] and encrypting the session key with a public key to produce an encrypted session key [310]. The message may be encrypted with the session key to produce an encrypted message [320]. A random number generator may be seeded with the public key [335], and the encrypted session key may be embedded throughout the file in locations corresponding to random numbers produced by the random number generator [340]. The random number generator may be seeded with the session key [345], and the encrypted message may be embedded throughout the file in locations corresponding to random numbers produced by the random number generator after the seeding with the session key [355].

22 Claims, 5 Drawing Sheets

METHODS FOR DATA ENCRYPTION USING MULTIPLE LAYER STEGANOGRAPHY

BACKGROUND OF THE INVENTION

1. Field of the Invention

The present invention relates generally to data encryption and, more particularly, to data encryption using steganography.

2. Description of Related Art

Steganography refers to an established class of techniques for embedding and hiding messages within files. Typical steganographic techniques embed each bit of a message in, for example, different bytes of a media file (e.g., picture, video, audio, etc.). If the least significant bits (LSBs) of the media file's bytes are used to store the message bits, the resultant media file appears unchanged to the eye or ear. Such techniques typically rely on a lack of knowledge that the media file contains the message for the security of the message.

The message bits within the media file, however, are not typically secure. A knowledgeable attacker may implement a reverse of the procedure used to embed the message bits in the media file and may obtain the original message.

As a result, there exists a need for techniques that facilitate the hiding of data within files, while providing additional message security.

SUMMARY OF THE INVENTION

Methods consistent with the present invention address this and other needs by providing multiple layers of message obscuration in the process of embedding a message within a file.

In accordance with one purpose of the invention as embodied and broadly described herein, a method for embedding a message within a file may include generating a random key and encrypting the random key to produce an encrypted random key. The message may be encrypted to produce an encrypted message. The encrypted random key and the encrypted message may be embedded in the file. At least one of the encrypted random key and the encrypted message may be embedded in random locations throughout the file.

In another implementation consistent with the present invention, a method for embedding a message within a file may include compressing the message to produce a compressed message and generating a random key. An encrypted random key may be produced by encrypting the random key with a public key. An encrypted message may be produced by encrypting the compressed message with the random key. An encrypted message length may be produced by encrypting a length of the encrypted message with the random key. The method may also include seeding a random number generator. The encrypted random key, the encrypted message length, and the encrypted message may be embedded in the file. At least one of the encrypted random key, the encrypted message length, and the encrypted message may be embedded throughout the file in locations corresponding to random numbers produced by the random number generator.

In a further implementation consistent with the present invention, a method for embedding a message within a file may include generating a session key and encrypting the session key with a public key to produce an encrypted session key. The message may be encrypted with the session key to produce an encrypted message. A random number generator may be seeded with the public key, and the encrypted session key may be embedded throughout the file in locations corresponding to random numbers produced by the random number generator. The random number generator may be seeded with the session key, and the encrypted message may be embedded throughout the file in locations corresponding to random numbers produced by the random number generator after the seeding with the session key.

In yet another implementation consistent with the present invention, a computer-readable medium that stores instructions executable by one or more processors to embed a message within a file may include instructions for generating a random session key. The computer-readable medium may also include instructions for encrypting the session key to produce an encrypted session key and instructions for encrypting the message to produce an encrypted message. The computer-readable medium may further include instructions for seeding a random number generator and instructions for randomly embedding the encrypted session key throughout the file in locations corresponding to random numbers produced by the random number generator. The computer-readable medium may additionally include instructions for re-seeding the random number generator and instructions for randomly embedding the encrypted message throughout the file in locations corresponding to random numbers produced by the random number generator after the re-seeding.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Methods consistent with the present invention provide multiple layers of message obscuration in the process of embedding a message within a file. The layers of obscuration may be analogized to the layers of an onion, which must be sequentially removed to get to the center.

Exemplary Network

Figure 1:
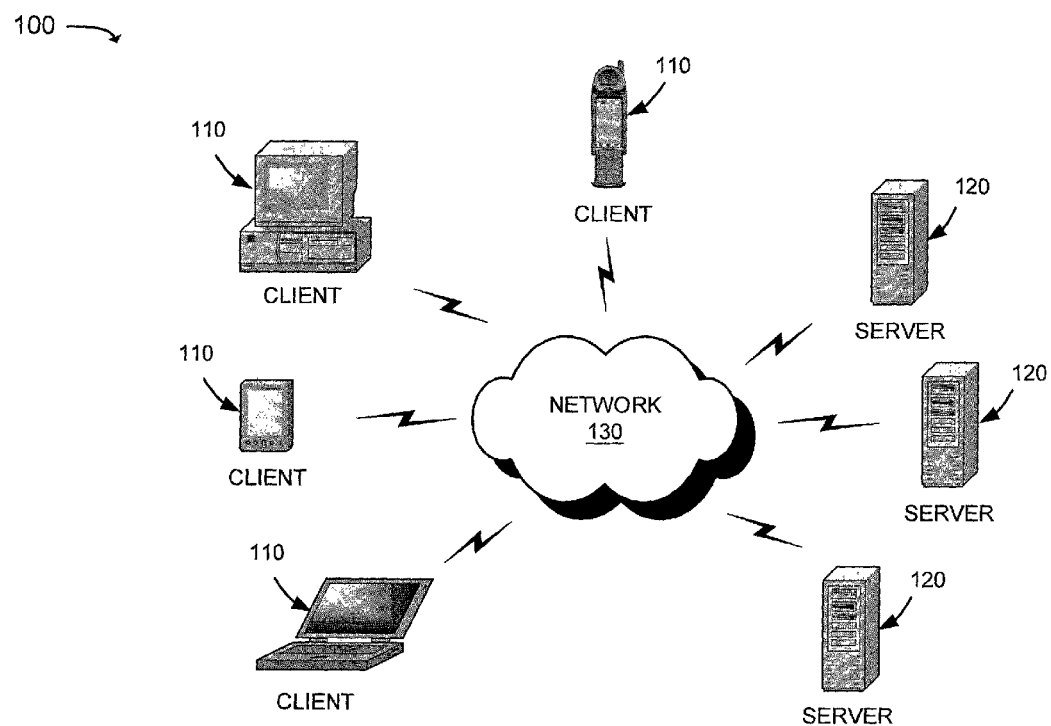
FIG. 1 is a diagram of an exemplary network in which systems and methods consistent with the present invention may be implemented.

FIG. 1 is an exemplary diagram of a network 100 in which systems and methods consistent with the present invention may be implemented. The network 100 may include multiple clients 110 connected to multiple servers 120 via a network 130. The network 130 may include a local area network (LAN), a wide area network (WAN), a telephone network, such as the Public Switched Telephone Network (PSTN), an intranet, the Internet, a similar or dissimilar network, or a combination of networks. Four clients 110 and three servers 120 have been illustrated as connected to network 130 in FIG. 1 for simplicity of explanation. In practice, there may be more or less clients 110 and servers 120.

The clients 110 may include devices, such as wireless telephones, personal computers, personal digital assistants (PDAs), notebook computers, etc., threads or processes running on these devices, and/or objects executable by these devices. The servers 120 may include server devices, threads, and/or objects executable by these devices. The clients 110 and servers 120 may connect to the network 130 via wired, wireless, or optical connections.

Figure 2:
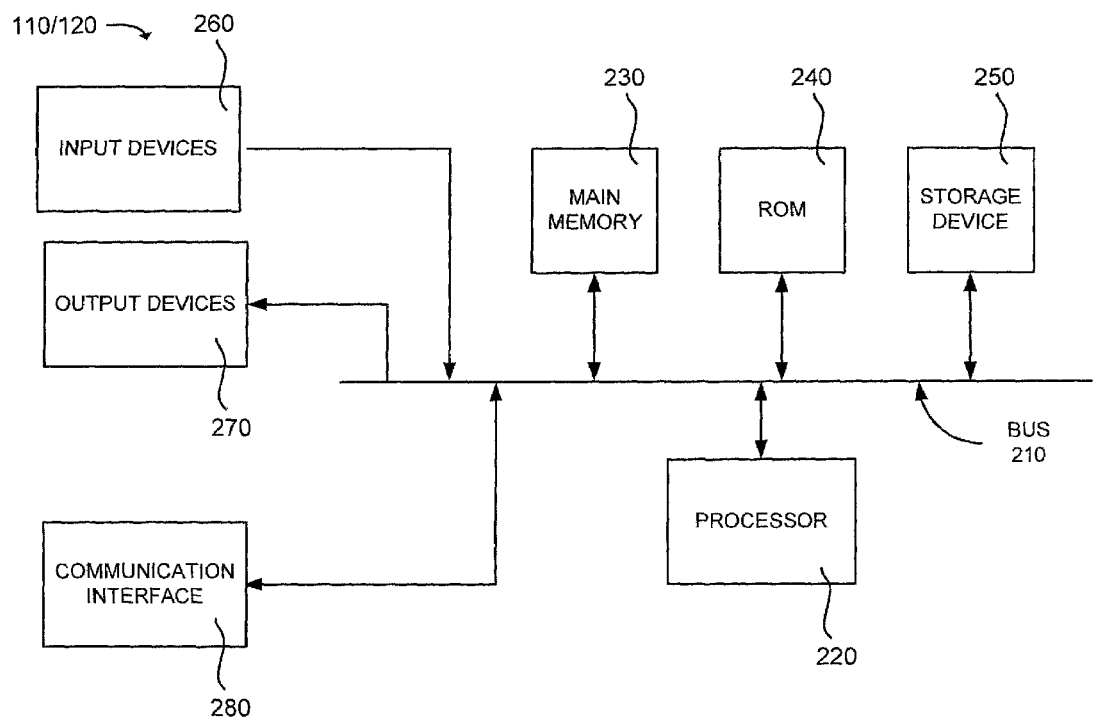
FIG. 2 is an exemplary diagram of a client or server of FIG. 1 in an implementation consistent with the present invention.

FIG. 2 is an exemplary diagram of a client 110 or server 120 in an implementation consistent with the present invention. The client 110 or server 120 may include a bus 210, a processor 220, a main memory 230, a read only memory (ROM) 240, a storage device 250, one or more input devices 260, one or more output devices 270, and a communication interface 280. The bus 210 may include one or more conductors that permit communication among the components of the server 120.

The processor 220 may include any type of conventional processor or microprocessor that interprets and executes instructions. The main memory 230 may include a random access memory (RAM) or another dynamic storage device that stores information and instructions for execution by the processor 220. The ROM 240 may include a conventional ROM device or another type of static storage device that stores static information and instructions for use by the processor 220. The storage device 250 may include a magnetic and/or optical recording medium and its corresponding drive.

The input devices 260 may include one or more conventional mechanisms that permit an operator to input information to the server 120, such as a keyboard, a mouse, a pen, voice recognition and/or biometric mechanisms, etc. The output devices 270 may include one or more conventional mechanisms that output information to the operator, including a display, a printer, a speaker, etc. The communication interface 280 may include any transceiver-like mechanism (e.g., a network interface card) that enables the client 110 or server 120 to communicate with other devices and/or systems. For example, the communication interface 280 may include mechanisms for communicating with another device or system via a network, such as network 130.

As will be described in detail below, a client 110 or server 120, consistent with the present invention, encrypts information into, or decrypts information out of, a file. The client 110 or server 120 may perform this task in response to processor 220 executing software instructions contained in a computer-readable medium, such as memory 230. A computer-readable medium may be defined as one or more memory devices and/or carrier waves.

The software instructions may be read into memory 230 from another computer-readable medium, such as the data storage device 250, or from another device via the communication interface 280. The software instructions contained in memory 230 cause processor 220 to perform processes that will be described later. Alternatively, hardwired circuitry may be used in place of, or in combination with, software instructions to implement processes consistent with the present invention. Thus, the present invention is not limited to any specific combination of hardware circuitry and software.

Exemplary Processing for Encrypting Data

Figure 3:
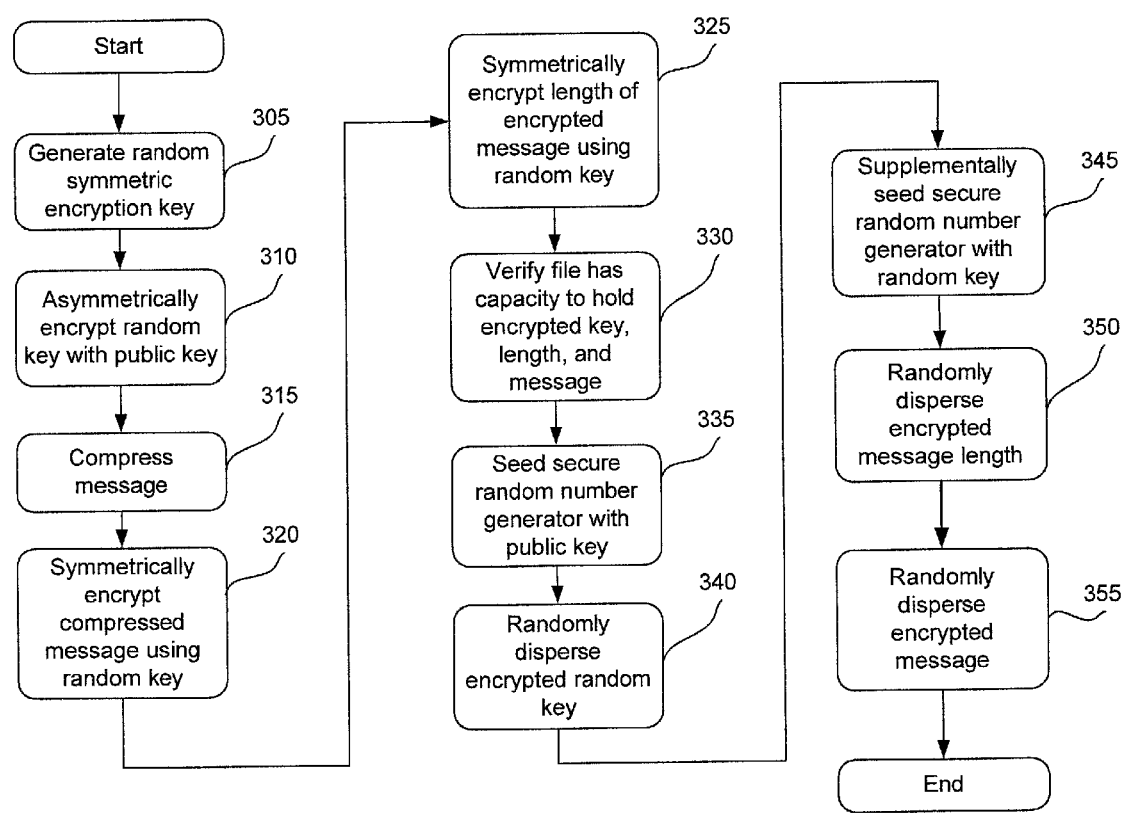
FIG. 3 is a flow chart of exemplary encryption processing according to an implementation consistent with the present invention.

FIG. 3 is a flow chart of exemplary encryption processing according to an implementation consistent with the present invention. The encryption processing shown may be performed by a client 110, a server 120, or some combination of clients 110 and servers 120. The processing described below securely embeds a message within a target file. The message may include, for example, a number of American Standard Code for Information Interchange (ASCII) characters. The message may also include a text message, an audio message, a visual message, a multimedia message or any type of message that may be represented as a string of bits.

Processing may begin with the generation of a random symmetric encryption key [act 305]. The random key may be, for example, 128 bits long, and may also be referred to as a "session key." In one implementation consistent with the present invention, the random key may be of a length usable with an encryption algorithm such as the Advanced Encryption Standard (AES) Rijndael algorithm. AES is a relatively recently-developed standard in the United States. However, other presently known or later-developed symmetric encryption algorithms may be used with the random key, such as Data Encryption Standard (DES), Triple DES, Twofish, Blowfish, etc.

The random key may be asymmetrically encrypted with an intended recipient's public key to produce an encrypted random key [act 310]. In one implementation consistent with the present invention, the algorithm used to encrypt the random key may be the Rivest Shamir Adelman (RSA) algorithm that is an asymmetric encryption algorithm. In one implementation consistent with the present invention, a 1024-bit key may be used, but other key sizes are possible. As is known in the art, the RSA algorithm involves encryption by a user's public key, and decryption by a corresponding private key. However, other presently known or later-developed asymmetric encryption algorithms may be used to encrypt the random key, such as International Data Encryption Algorithm (IDEA), etc.

The message may be compressed by a lossless compression algorithm [act 315]. In one implementation consistent with the present invention, the compression algorithm used may be GNU zip (GZIP). However, other presently known or later-developed lossless compression algorithms may be used to compress the message, such as Zip, Huffman encoding, etc. Compression of the message not only shortens it (thereby allowing a longer message to be embedded in a file of a given size), but also provides one layer of obscuration for the message.

The compressed message may be symmetrically encrypted using the (unencrypted) random key [act 320]. In one implementation consistent with the present invention, the algorithm used to encrypt the compressed message may be the AES Rijndael algorithm. Other symmetric algorithms may be used, however, as explained above.

A value indicating the length of the encrypted and compressed message (e.g., in bits) may be symmetrically encrypted using the (unencrypted) random key [act 325]. In one implementation consistent with the present invention, the algorithm used to encrypt the message length may be the AES Rijndael algorithm. Other symmetric algorithms may be used, however, as explained above. In one implementation, a field of 32 bits or more may be used to represent the length of the encrypted message. Upon encryption, this encrypted message length field may have a resulting length of 16 bytes, due to padding associated with the symmetric encryption.

Figure 4:
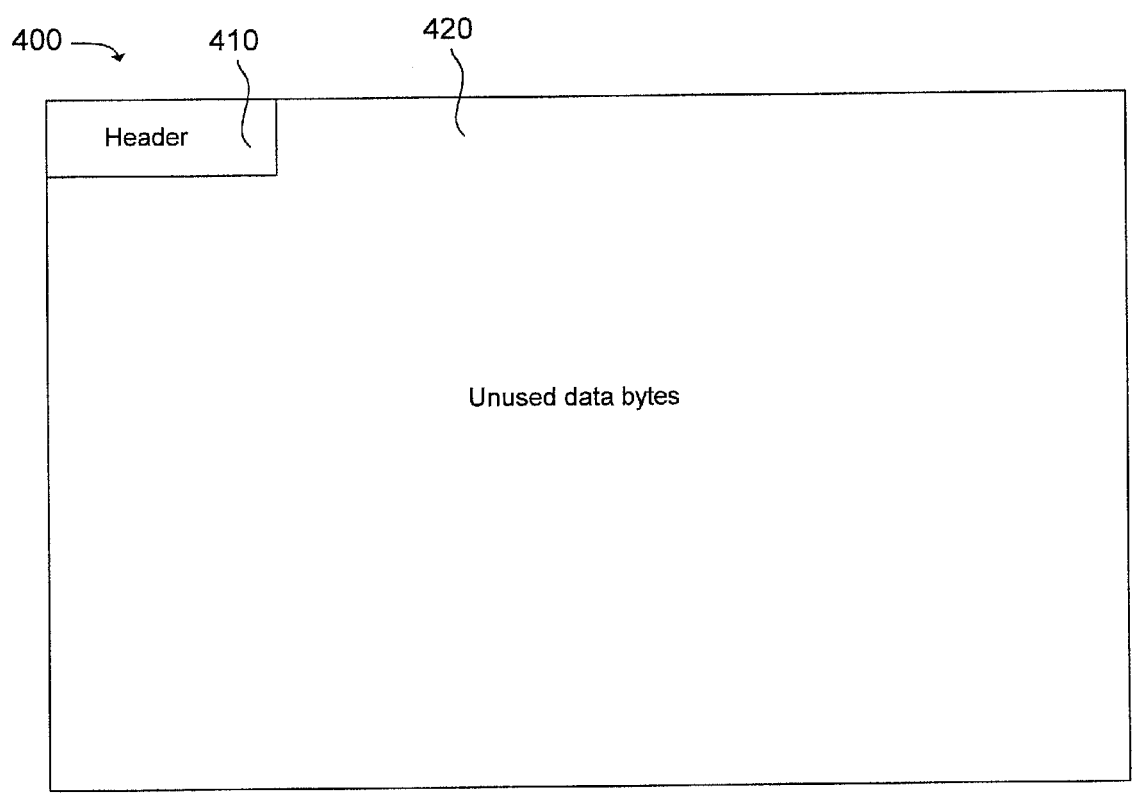
FIG. 4 is an exemplary file structure that aids in understanding the processing performed in FIG. 3.

The total length in bits of the encrypted random key, the encrypted length, and the encrypted message may be determined. The number of unused data bytes in the file may also be determined. Certain file types contain file-specific headers that may not be altered. The remaining data bytes in the file, or some part thereof, may be referred to as "unused bytes." FIG. 4 illustrates an exemplary data file 400 having such an unalterable header portion 410 and an unused data byte portion 420. The total length of the encrypted random key, the encrypted length, and the encrypted message may be compared to the number of unused data bytes 420 in the file to verify that the encrypted message and its associated information will fit within the file [act 330]. In some file types (e.g., image files where each byte constitutes a pixel or one color of a pixel), a key/length/message bit may be inserted into each unused data byte. In other file types (e.g., sound files where a sample may extend over multiple bytes), a key/length/message bit may be inserted into, for example, only the least significant bytes of the respective samples. Various different implementations, such as determining what constitutes an "unused data byte" in a particular file will be apparent to those skilled in the art.

Assuming that the file will hold the encrypted key, length, and message, a secure random number generator may be seeded with the intended recipient's public key [act 335]. As used herein a "secure random number generator" is one whose output is cryptographically secure (e.g., non-periodic) as is understood in the art. The random number generator in one implementation consistent with the present invention may be a Secure Hashing Algorithm (SHA) random number generator. The random number generator may be initialized by this first seed, and may generate a deterministic stream of random numbers based on the seeding by the public key. Other parameters may be input to the random number generator, such as the range of random numbers to be generated (e.g., from 1 to the number of unused bytes in the file). The random number generator may generate as many unique random numbers as, for example, the number of bits in the encrypted random key. The random numbers should be unique to avoid dispersing, for example, two message bits to the same byte location.

The generated random numbers may be used to randomly disperse the bits of the encrypted key throughout the file [act 340]. For example, each bit of the encrypted key may be sequentially inserted into the least significant bit (LSB) of unused bytes that correspond to the generated random numbers. A Boolean string, for example, may be used to keep track of which unused bytes have been written to, and to ensure that the random numbers specify the proper number of unique byte locations to disperse the encrypted key.

The secure random number generator may be supplementally seeded with the (unencrypted) random key [act 345]. The random number generator may have a certain state (i.e., its state after generating the string of random numbers needed to randomly disperse the encoded random key in act 340) at the time of supplementary seeding by the random key. The string of random numbers generated after the supplemental seeding may depend on the certain state of the random number generator (which in turn depends on the seeding by the public key in act 335) and the seeding by the random key. Hence, the deterministic stream of random numbers generated is based on both the seedings by the random key and by the public key. In effect, such double seeding of the random number generator necessitates the presence of both the random key and the public key to generate the same stream of random numbers when decoding (see FIG. 5).

The encrypted length of the message may be randomly dispersed throughout the file using the stream of random numbers generated by the random number generator [act 350]. The encrypted message itself may be randomly dispersed throughout the file using the remaining stream of random numbers generated by the random number generator [act 355]. If the encrypted message (plus the encrypted key and the encrypted length which have already been written) fits in, for example, 50% of the total unused bytes, then the entire encrypted message may be randomly dispersed. If, however, the size of the encrypted message (plus the encrypted key and the encrypted length which have already been written) exceeds this 50% threshold of the total unused bytes, the encrypted message may be randomly dispersed until this threshold is reached, and then the bits of the encrypted message may be sequentially written to the remaining unused bytes that have not been written to. Such sequential writing may also be seen as "randomly" dispersing data, because the locations of the bytes that have been previously dispersed were randomly determined. Hence, the locations of the remaining bytes that will be sequentially written are also random.

The threshold mentioned above (e.g., 50%) may be referred to as the "dispersion factor" of the file. In practice, a limit on the random dispersion of data within the file is desirable for performance reasons. Attempting to generate a unique random sequence for, e.g., all unused bytes in a file may be a lengthy operation. Accordingly, some dispersion factor may be chosen, beyond which the encoded message bits may be sequentially written in the remaining unused bytes. The dispersion factor may be chosen to be greater or less than 50%, and it directly affects the order in which the encrypted message bits are dispersed into the file. Accordingly, the dispersion factor chosen within the encryption processing provides another layer of obscuration for the message.

Exemplary Processing for Decrypting Data

Figure 5:
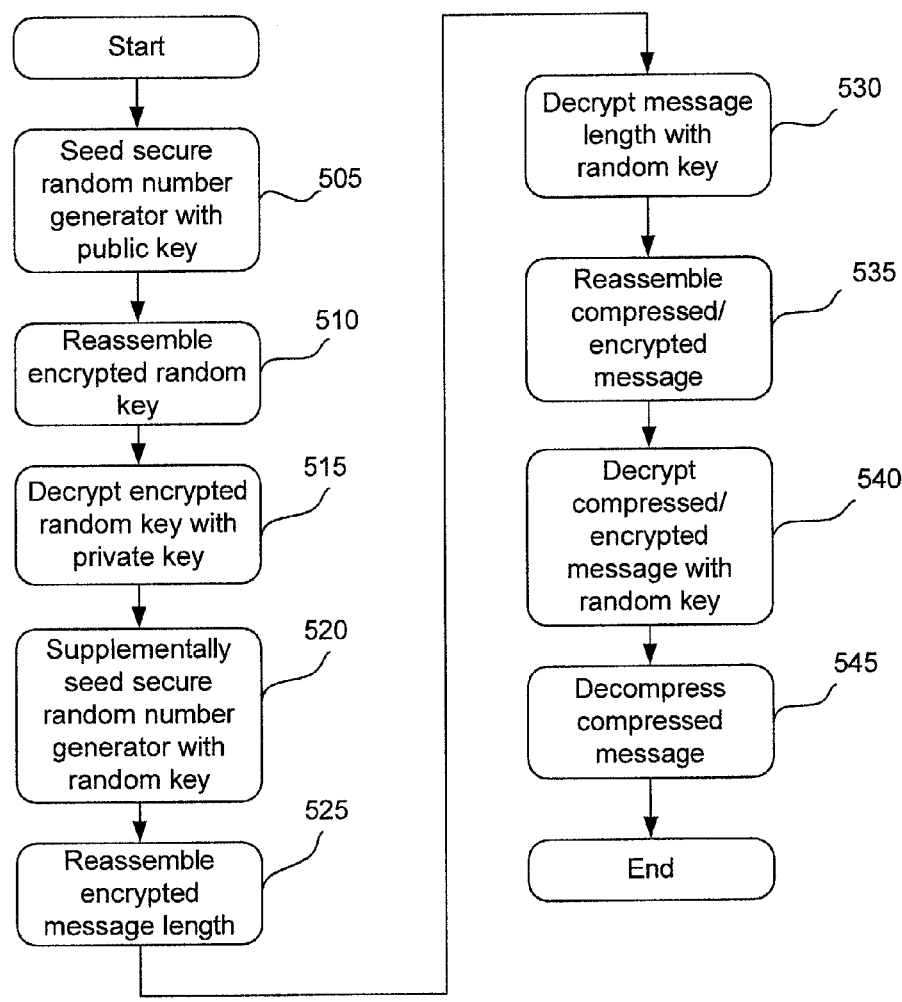
FIG. 5 is a flow chart of exemplary decryption processing according to an implementation consistent with the present invention.

FIG. 5 is a flow chart of exemplary decryption processing according to an implementation consistent with the present invention. The decryption processing shown may be performed by a client 110, a server 120, or some combination of clients 110 and servers 120. The decryption processing described below extracts a securely embedded message from a target file, and flows in substantially reverse (i.e., mirrored) order from the encryption processing in FIG. 3. To obtain the original message, the same algorithms should be used for decryption as were used for encryption.

Processing may begin with seeding the secure random number generator with the intended recipient's public key [act 505]. The random numbers generated may indicate the byte positions of the bits that constitute the encrypted random key within the file. Each bit of the encrypted key may be sequentially read from the least significant bit (LSB) of unused bytes that correspond to the generated random numbers. Once a string of random numbers that corresponds to the number of bits of the encrypted random key is generated, the encrypted random key may be re-assembled [act 510].

The encrypted random key may be asymmetrically decrypted (because it was encrypted using the public key) by using the intended recipient's private key [act 515]. The use of public/private key pair asymmetric encryption provides a further layer of obscuration for the message.

The secure random number generator may be supplementally seeded with the (unencrypted) random key [act 520]. As explained above, the random number generator may have a certain state (i.e., its state after generating the string of random numbers needed to find the encoded random key in act 510) at the time of supplementary seeding by the random key. The string of random numbers generated after the supplemental seeding may depend on the certain state of the random number generator (which in turn depends on the seeding by the public key in act 505) and the seeding by the random key. Thus, the same deterministic stream of random numbers may be generated as was used to randomly disperse the encoded length of the message in the file.

A series of unique random numbers (e.g., 16 bytes' worth of such unique random numbers) may be generated, and the corresponding LSBs of byte locations may be re-assembled into the encrypted message length [act 525]. As with the encryption described above in FIG. 3, the uniqueness of the random numbers may be tracked by, for example, a Boolean vector. The encrypted message length may be symmetrically decrypted using the random key [act 530]. For example, the AES algorithm may be used for such decryption.

Using the message length of the encrypted message, the total number of encrypted key, encrypted message length, and encrypted message bits may be determined. If this total number is less than, for example, 50% of the available byte positions, a series of random numbers may be generated to determine the byte positions of the encrypted message within the file. The encrypted (and compressed) message may be reassembled from the LSBs at these byte positions [act 535]. If, however, the total number of key, length, and message bits is greater than 50% of the available byte positions, random numbers may be generated to reassemble those message bits up to the 50% point, and then sequentially assemble the remaining bits of the message from the remaining byte positions. A boolean string, for example, may be used in acts 510, 525, and 535 to keep track of which bytes of the file have been read from.

The encrypted (and compressed) message may be decrypted using the random key [act 540]. For example, the AES algorithm may be used for such decryption. The unencrypted, but still compressed, message may be decompressed [act 545]. For example, the GZIP algorithm may be used for such decompression. In this manner, the original message may be extracted from the file.

The above encryption and decryption processing may be implemented in computer-executable instructions. In one exemplary implementation consistent with the present invention, the encryption and decryption algorithms may be implemented in Java™ using the Java Cryptography Architecture (JCA) and associated Java Cryptography Extensions (JCE). Other software implementations of the methods described in FIGS. 3 and 5 will be apparent to those skilled in the programming art.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, although the present invention has been described with respect to media files (e.g., picture, audio, video) due in part to the ubiquity of these files on the Internet, other file types may be used as the container for the message. For example, any type of file that can tolerate a change in one or more bits within its bytes without significantly altering the file may be used. Further, although the present invention has been characterized as "encrypting" a message, it may also be applied to watermarking, authentication, and other types of operations on digital files that are not readily discernable by a casual observer or user.

Also, compression, encryption, and random number generating algorithms other than the examples given above may be used. Additionally, the dispersion of the random key, the key's length, and the message need not necessarily all be random. One or more of these may be placed in a predetermined location or locations (e.g., start, end, 300 bytes from the start, etc.) within the file. In other implementations, the random number generator may be seeded only once or more than twice. Other implementation details may be changed, such as embedding a message within, for example, the least-significant two bits within a byte of file data.

Moreover, additional layers of obscuration may be used. For example, although the dispersion factor was described as being a fixed percentage, it may be some random percentage based on a random number generated by the random number generator. The random number associated with the dispersion factor may be generated from one of the above-described two seedings, or it may involve, for example a third seeding of the random number generator. Additional obscuration techniques are possible and contemplated, such as bit-wise inversion of the key, message, etc. Conversely, fewer layers of obscuration than those described may be used.

Further, the acts in FIGS. 3 and 5 need not be implemented in the order shown; nor do all of the acts need to be performed. Also, those acts which are not dependent on other acts may be performed in parallel with the other acts.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

The invention claimed is:

1. A method for embedding a message within a file, comprising:
   generating a random key;
   encrypting the random key to produce an encrypted random key;
   encrypting the message to produce an encrypted message; and
   embedding the encrypted random key and the encrypted message in the file, at least one of the encrypted random key and the encrypted message being embedded in random locations throughout the file, wherein the embedding further includes:
   seeding a random number generator with an intended recipient's public key, and supplementally seeding the random number generator with the random key,
      embedding the encrypted message at locations in the file corresponding to random numbers generated by the random number generator after supplementally seeding the random number generator with the random key until a total number of bits embedded equals a predetermined percentage of available space within the file, and embedding the encrypted message at sequential unused locations in the file when the total number of bits embedded exceeds the predetermined percentage of available space within the file.

2. The method of claim 1, wherein the generating includes:
generating a random symmetric encryption key.

3. The method of claim 2, wherein the encrypting the message includes:
symmetrically encrypting the message with the random symmetric encryption key.

4. The method of claim 1, wherein the encrypting the random key includes:
asymmetrically encrypting the random key with the intended recipient's public key.

5. The method of claim 1, further comprising:
compressing the message to obtain a compressed message prior to the encrypting the message.

6. The method of claim 5, further comprising:
encrypting a length of the encrypted message with the random key to obtain an encrypted message length.

7. The method of claim 6, further comprising:
verifying that the file has sufficient capacity to contain the encrypted message length, the encrypted random key, and the encrypted message.

8. The method of claim 1, wherein the embedding includes:
randomly embedding both the encrypted random key and the encrypted message throughout the file.

9. The method of claim 1, wherein the embedding further includes:
embedding the encrypted random key at locations in the file corresponding to random numbers generated by the random number generator after the seeding the random number generator with the intended recipient's public key.

10. A method for embedding a message within a file, comprising:
compressing the message to produce a compressed message;
generating a random key;
encrypting the random key with a public key to produce an encrypted random key;
encrypting the compressed message with the random key to produce an encrypted message;
encrypting a length of the encrypted message with the random key to produce an encrypted message length;
seeding a random number generator with the public key and supplementally seeding the random number generator with the random key; and
embedding the encrypted random key, the encrypted message length, and the encrypted message in the file, at least one of the encrypted random key, the encrypted message length, and the encrypted message being embedded in locations throughout the file corresponding to random numbers produced by the random number generator;
wherein the embedding further includes:
embedding the encrypted message at locations in the file corresponding to random numbers generated by the random number generator after supplementally seeding the random number generator with the random key until a total number of bits embedded equals a predetermined percentage of available space within the file, and
embedding the encrypted message at sequential unused locations in the file when the total number of bits embedded exceeds the predetermined percentage of available space within the file.

11. The method of claim 10, further comprising:
verifying that the file has sufficient capacity to contain the encrypted message length, the encrypted random key, and the encrypted message.

12. The method of claim 10, wherein the embedding includes:
embedding each of the encrypted random key, the encrypted message length, and the encrypted message in locations throughout the file corresponding to random numbers produced by the random number generator.

13. The method of claim 10, wherein the supplementally seeding causes the random number generator to produce numbers based on both the random key and a state of the random number generator at a time of the supplementally seeding.

14. The method of claim 10, wherein the embedding further includes:
embedding the encrypted random key at locations in the file corresponding to random numbers generated by the random number generator after the seeding the random number generator with the public key.

15. The method of claim 10, wherein the embedding further includes:
embedding the encrypted message length at locations in the file corresponding to random numbers generated by the random number generator after the supplementally seeding the random number generator with the random key.

16. A method for embedding a message within a file, comprising:
generating a session key;
encrypting the session key with a public key to produce an encrypted session key;
encrypting the message with the session key to produce an encrypted message;
seeding a random number generator with the public key;
embedding the encrypted session key throughout the file in locations corresponding to random numbers produced by the random number generator;
seeding the random number generator with the session key; and
embedding the encrypted message throughout the file in locations corresponding to random numbers produced by the random number generator after the seeding with the session key wherein the embedding includes:
embedding the encrypted message at locations in the file corresponding to random numbers generated by the random number generator after seeding the random number generator with the session key until a total number of bits embedded in the file equals a determined percentage of available space within the file, and
embedding the encrypted message at sequential unused locations in the file when the total number of bits embedded exceeds the determined percentage of available space within the file.

17. The method of claim 16, further comprising:
encrypting a length of the encrypted message with the session key to produce an encrypted message length; and
embedding the encrypted message length throughout the file in locations corresponding to random numbers produced by the random number generator after the seeding with the session key.

18. The method of claim 16, wherein the determined percentage is a fixed percentage.

19. The method of claim 16, further comprising: randomly determining the determined percentage.

20. A computer-readable medium that stores instructions executable by one or more processors to embed a message within a file, comprising:
instructions for generating a random session key;
instructions for encrypting the session key to produce an encrypted session key;
instructions for encrypting the message to produce an encrypted message;
instructions for seeding a random number generator;
instructions for randomly embedding the encrypted session key throughout the file in locations corresponding to random numbers produced by the random number generator;
instructions for re-seeding the random number generator; and
instructions for embedding the encrypted message throughout the file in locations corresponding to random numbers produced by the random number generator after the re-seeding, the embedding continuing until a total number of bits embedded in the file equals a determined percentage of available space within the file; and
instructions for randomly determining the determined percentage.

21. A processing device, comprising:
a processor, and
a memory operatively coupled to the processor and containing a message, a file, and instructions which when executed by the processor perform the functions of:
generating a random key,
encrypting the random key to produce an encrypted random key,
encrypting the message to produce an encrypted message, and
embedding the encrypted random key and the encrypted message in the file, at least one the encrypted random key and the encrypted message being embedded in random locations throughout the file, wherein the embedding further includes:
seeding a random number generator with an intended recipient's public key, and supplementally seeding the random number generator with the random key,
embedding the encrypted message at locations in the file corresponding to random numbers generated by the random number generator after supplementally seeding the random number generator with the random key until a total number of bits embedded equals a predetermined percentage of available space within the file, and
embedding the encrypted message at sequential unused locations in the file when the total number of bits embedded exceeds the predetermined percentage of available space within the file.

22. A method for embedding a message within a file, comprising:
generating a session key;
encrypting the session key with a public key to produce an encrypted session key;
encrypting the message with the session key to produce an encrypted message;
seeding a random number generator with the public key;
embedding the encrypted session key throughout the file in locations corresponding to random numbers produced by the random number generator;
seeding the random number generator with the session key;
embedding the encrypted message at locations in the file corresponding to random numbers generated by the random number generator after seeding the random number generator with the session key, the embedding continuing until a total number of bits embedded in the file equals a determined percentage of available space within the file; and
randomly determining the determined percentage.

* * * * *